(12) United States Patent
Neal

(10) Patent No.: US 10,793,054 B2
(45) Date of Patent: Oct. 6, 2020

(54) VEHICLE LIGHT SYSTEM

(71) Applicant: Sean Neal, Macomb, MI (US)

(72) Inventor: Sean Neal, Macomb, MI (US)

( * ) Notice: Subject to any disclaimer, the term of this patent is extended or adjusted under 35 U.S.C. 154(b) by 92 days.

(21) Appl. No.: 15/450,464

(22) Filed: Mar. 6, 2017

(65) Prior Publication Data
US 2017/0253170 A1    Sep. 7, 2017

Related U.S. Application Data

(60) Provisional application No. 62/303,548, filed on Mar. 4, 2016.

(51) Int. Cl.
| | |
|---|---|
| *H04N 7/18* | (2006.01) |
| *B60Q 1/00* | (2006.01) |
| *B60R 1/00* | (2006.01) |
| *B60Q 1/24* | (2006.01) |
| *G06K 9/00* | (2006.01) |
| *B60Q 1/30* | (2006.01) |
| *G06K 9/20* | (2006.01) |
| *B60Q 1/26* | (2006.01) |

(52) U.S. Cl.
CPC ......... *B60Q 1/0023* (2013.01); *B60Q 1/0041* (2013.01); *B60Q 1/24* (2013.01); *B60Q 1/2661* (2013.01); *B60Q 1/30* (2013.01); *B60R 1/00* (2013.01); *G06K 9/00791* (2013.01); *G06K 9/2027* (2013.01); *H04N 7/181* (2013.01); *B60R 2300/105* (2013.01)

(58) Field of Classification Search
CPC ........ H04N 7/18; H04N 7/181; B60Q 1/0023; B60Q 1/0041; B60Q 1/24; B60Q 1/2661; B60Q 1/30; B60R 1/00; B60R 2300/105; B60K 9/00791; B60K 9/2027
USPC .......................................................... 348/148
See application file for complete search history.

(56) References Cited

U.S. PATENT DOCUMENTS

| | | | |
|---|---|---|---|
| 6,420,704 B1 | 7/2002 | Berenz et al. | |
| 6,986,597 B2 | 1/2006 | Elwell | |
| 8,183,991 B2 | 5/2012 | Yagi et al. | |
| 8,700,258 B2* | 4/2014 | Tate, Jr. ............... | B62D 15/028 |
| | | | 340/435 |
| 9,956,903 B2* | 5/2018 | Gondhi .................... | B60Q 1/22 |
| 2006/0171704 A1* | 8/2006 | Bingle .................... | B60R 11/04 |
| | | | 396/419 |
| 2009/0072996 A1 | 3/2009 | Schoepp | |
| 2011/0175719 A1 | 7/2011 | Ford | |

(Continued)

*Primary Examiner* — Trang U Tran
(74) *Attorney, Agent, or Firm* — Boudwin Intellectual Property; Daniel Boudwin

(57) ABSTRACT

A vehicle light system. The vehicle light system includes a front assembly having a plurality of lights and a first camera that is securable to a front end of a vehicle, and a rear assembly having a plurality of lights and a second camera that is securable to the rear end of the vehicle. A display operatively connected to the first camera and second camera is disposed within the vehicle interior. A control also disposed within the interior is operatively connected to the front assembly lights, the rear assembly lights, the first camera, the second camera, and the display. The lights improve the lighting of the surrounding area, thus decreasing the number of roadside incidents and increase the public awareness of the police vehicle, while the camera provides additional visibility to the vehicle operator.

12 Claims, 4 Drawing Sheets

(56) References Cited

U.S. PATENT DOCUMENTS

2013/0107046 A1    5/2013  Forgue
2015/0138819 A1*   5/2015  Salter .................. F21S 43/13
                                                    362/510

* cited by examiner

VEHICLE LIGHT SYSTEM

CROSS REFERENCE TO RELATED APPLICATIONS

This application claims the benefit of U.S. Provisional Application No. 62/303,548 filed on Mar. 4, 2016. The above identified patent application is herein incorporated by reference in its entirety to provide continuity of disclosure.

FIELD OF THE INVENTION

The present invention relates to lighting systems. More specifically, the present invention provides a vehicle lighting system for the front and rear of a vehicle having multiple cameras for increasing visibility.

BACKGROUND OF THE INVENTION

Police cars, ambulances, and other emergency vehicles are preferably highly visible to other motorists and pedestrians. One solution is to utilize roof mounted lights that provide additional illumination, notifying individuals of the presence of the emergency vehicle. However, rooftop lighting often is directed toward an individual's eyes and can distract other motorists or pedestrians, increasing the risk of an accident occurring.

Another solution is to utilize additional dashboard mounted lights that are visible from the exterior of the vehicle. However, these tend to blind the driver of the vehicle, increasing the risk of injury. Additionally, most emergency vehicles are difficult to maneuver safely and would perform better if an imaging display were utilized to display the area in front and rear of the vehicle. In order to address these concerns, the present invention provides a vehicle light system having a front light assembly with a front camera and rear light assembly with a rear camera, wherein the front and rear cameras are configured to transmit an image to a display in the vehicle interior, wherein the front and rear lights are configured to illuminate upon activation of the front and rear camera, respectively.

Devices have been disclosed in the known art that relate to vehicle lighting systems. These include devices that have been published in U.S. Patents and U.S. Patent Application Publications. These devices generally relate to vehicle lighting systems, such as U.S. Patent Application Publication No. 2013/0107046, U.S. Pat. Nos. 6,986,597; 8,183,991, U.S. Patent Application Publication Nos. 2011/0175719; 2009/0072996; and U.S. Pat. No. 6,420,704.

The devices in the known art have several disadvantages. The devices in the known art fail to provide an imaging system securable to a vehicle with additional illumination means for improving the captured image. Further, these devices fail to provide a system having a front and rear grill assembly, including cameras that are operably connected to a series of lights.

In light of the devices disclosed in the known art, it is submitted that the present invention substantially diverges in design elements from the prior art and consequently it is clear that there is a need in the art for an improvement to existing vehicle light systems. In this regard the present invention substantially fulfills these needs.

SUMMARY OF THE INVENTION

In view of the foregoing disadvantages inherent in the known types of vehicle light systems now present in the prior art, the present invention provides a vehicle light system wherein the same can be utilized for providing convenience for the user when illuminating the area surrounding a vehicle.

The present invention provides a vehicle light system for illuminating the area surrounding a vehicle. The vehicle light system includes a front assembly securable to a front end of a vehicle, the front assembly having a plurality of lights and a first camera thereon, and a rear assembly securable to a rear end of a vehicle, the rear assembly having a plurality of lights and a second camera thereon. A display is operatively connected to the first camera and second camera. A control is operably connected to the front assembly lights, the rear assembly lights, the first camera, the second camera, and the display.

One object of the present invention is to provide all of the advantages of prior art vehicle light systems while avoiding the known disadvantages Another object of the present invention is to provide a vehicle light system having integrated cameras for providing increased visibility to the occupants of the vehicle.

A further object of the present invention is to provide a vehicle light system having front and rear light assemblies for increasing the presence of the vehicle, as well as illuminating the area surrounding the vehicle for increased passerby visibility.

Yet another object of the present invention is to provide a vehicle light assembly that reduces the instances of collisions, accidents, and otherwise dangerous incidents related to the vehicle.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
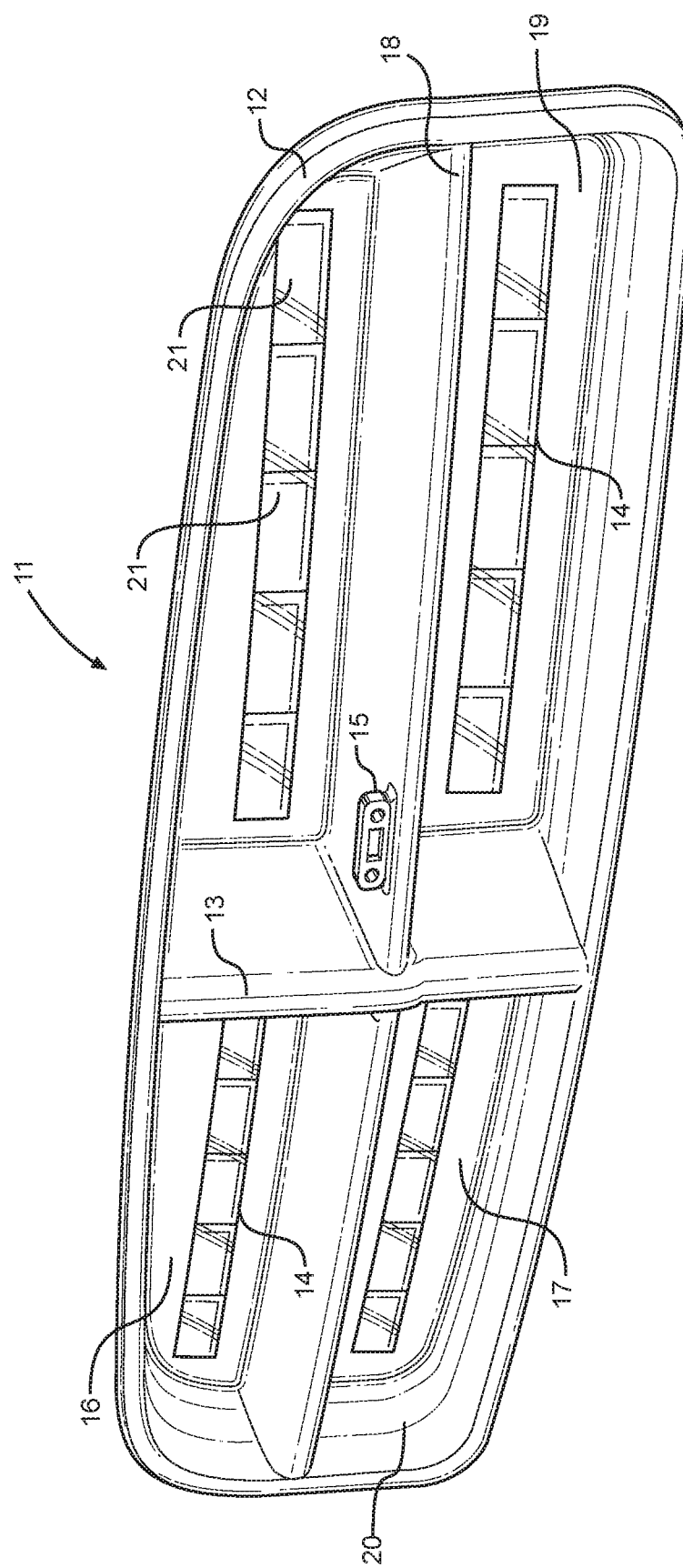
FIG. 1 shows a perspective view of the front assembly portion of the vehicle light system.

Reference is made herein to the attached drawings. Like reference numerals are used throughout the drawings to depict like or similar elements of the vehicle light system. For the purposes of presenting a brief and clear description of the present invention, the preferred embodiment will be discussed as used for illuminating the area surrounding a vehicle. The figures are intended for representative purposes only and should not be considered to be limiting in any respect.

Referring now to FIG. 1, there is shown a perspective view of the front assembly portion of the vehicle light system. The front assembly 11 comprises a housing 12 configured to function as a vehicle grill. The housing 12 includes a plurality of lights 14 thereon, which are preferably LED lights. In the illustrated embodiment, vents 21 are disposed between each of the lights 14 so that airflow may reach the vehicle engine for cooling purposes.

The lights 14 are disposed in a sequential pattern, forming a grouping of lights 14. In the illustrated embodiment, the groupings of lights 14 are separated by a horizontal divider 13 and a vertical divider 18, defining an upper left portion 16, a lower left portion 17, an upper right portion 19, and a lower right portion 20. A grouping of lights 14 is disposed within each of the four portions, providing for an even distribution of light.

The front assembly 11 further comprises a front camera 15 disposed on the housing 12. In the illustrated embodiment, the front camera 15 is disposed on an upper surface of the horizontal divider 13. However, the front camera 15 may be positioned anywhere on the housing 12 that provides an optimal viewing angle. The front camera 15 captures an image of the area in front of the vehicle and displays the image on a display within the vehicle interior. The lights 14 are configured to activate upon activation of the front camera 15, so that the image captured by the front camera 15 is clear and easily viewable by vehicle occupants. In the shown embodiment, the lights 14 are recessed within the upper left portion 16, lower left portion 17, upper right portion 19, and lower right portion 20. In this way, the front camera 15 is positioned between the lights 14 and the exterior of the vehicle.

Figure 2:
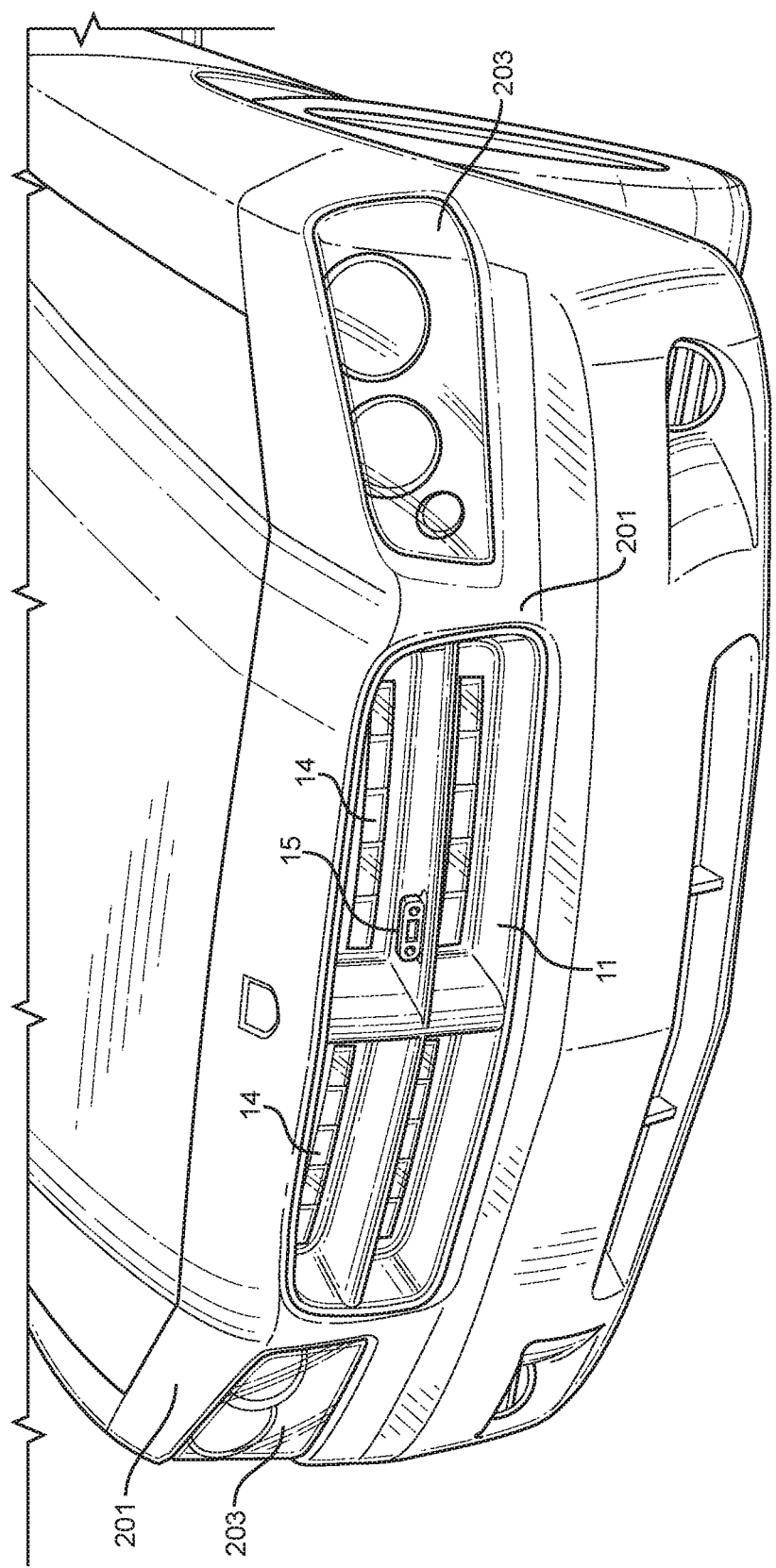
FIG. 2 shows a perspective view of the front assembly portion of the vehicle light system secured to a vehicle.

Referring now to FIG. 2, there is shown a perspective view of the front assembly portion of the vehicle light system secured to a vehicle. The front assembly 11 is secured to a front portion of a vehicle 201. The front camera 15 faces forward in the direction of the vehicle headlights 203. The lights 14 may operate in conjunction with the vehicle headlights 203 in order to provide additional illumination.

Figure 3:
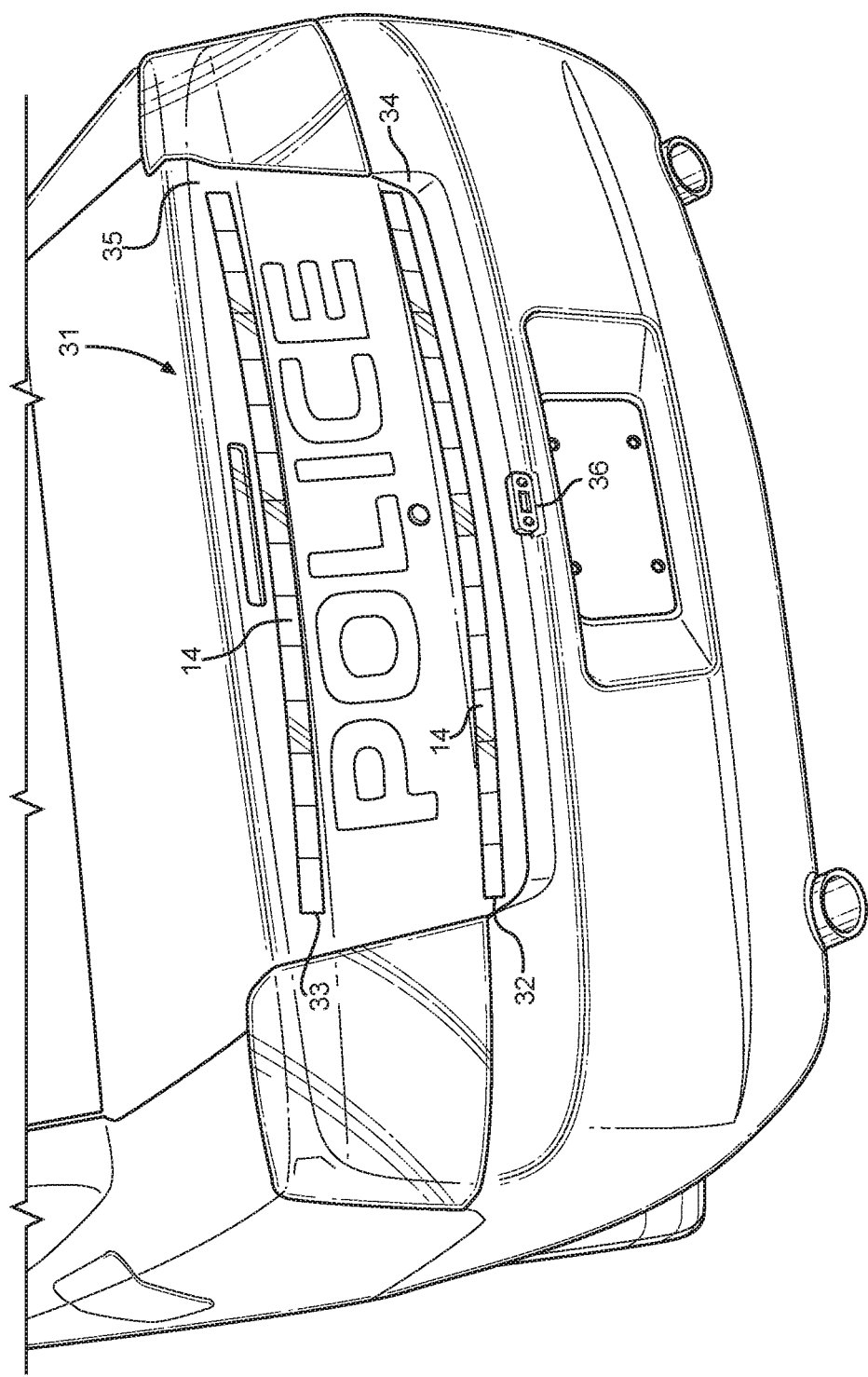
FIG. 3 shows a perspective view of the rear assembly portion of the vehicle light system secured to a vehicle.

Referring now to FIG. 3, there is shown a perspective view of the rear assembly portion of the vehicle light system secured to a vehicle. The vehicle light system further includes a rear assembly 31 securable to the rear side of a vehicle. The rear assembly 31 comprises a plurality of lights 14, which are preferably LEDs, and a rear camera 36. Similar to the front assembly, the lights 14 are configured to illuminate upon activation of the rear camera 36. In the illustrated embodiment, the lights 14 are arranged in an upper strip 33 disposed on an upper portion 35 of the vehicle, and a lower strip 32 disposed on a lower portion 34 of the vehicle.

Figure 4:
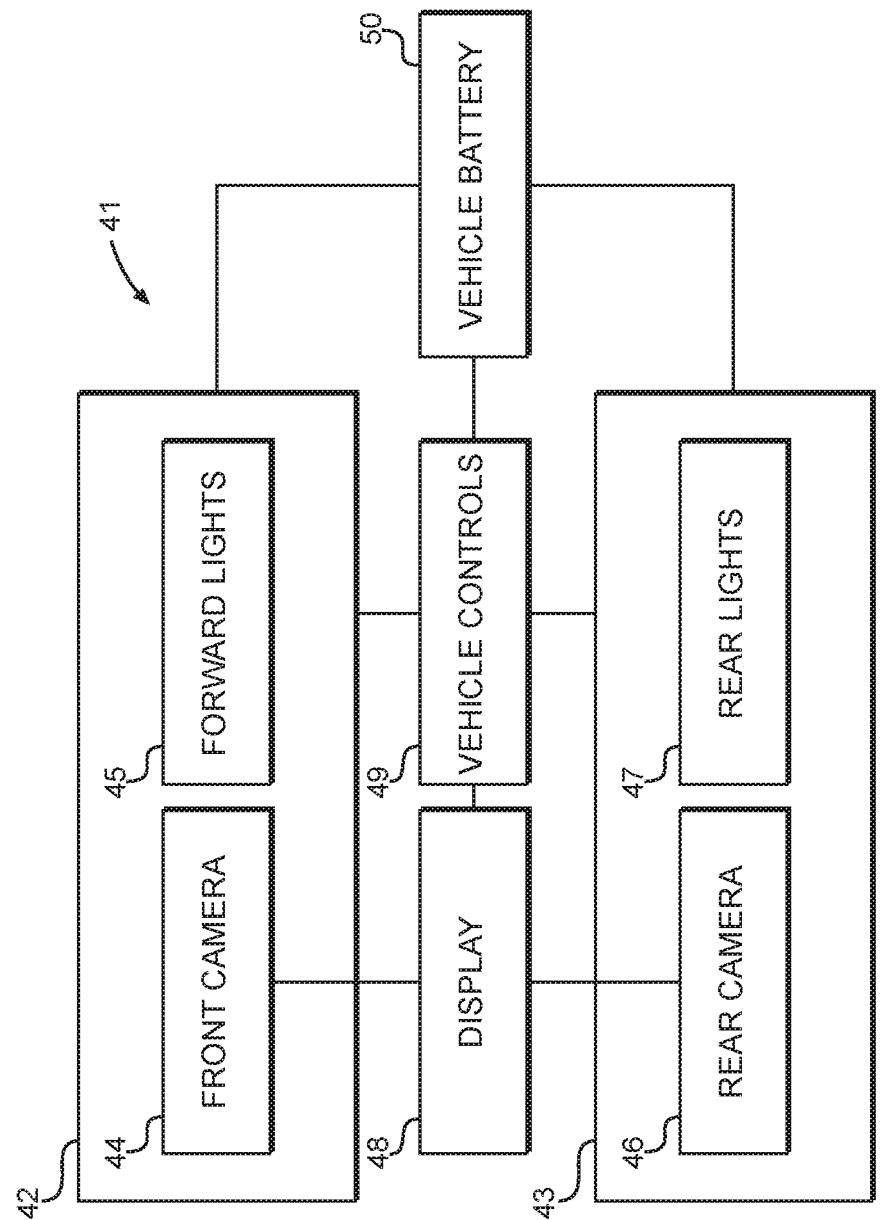
FIG. 4 shows a diagram of the components of the vehicle light system.

Referring now to FIG. 4, there is shown a diagram of the components of the vehicle light system. The front assembly 42, which includes a front camera 44 operably connected to forward lights 45, and the rear assembly 43, which includes a rear camera 46 operably connected to rear lights 47, are both operably connected to the vehicle battery 50. The front assembly 42 and rear assembly 43 are further operably connected to the vehicle controls 49 in the vehicle interior. The vehicle controls 49 are used to control operation of the front and rear assemblies 42, 43. Preferably, the vehicle controls 49 can operate the front assembly 42 independent of the rear assembly 43, and vice versa.

The vehicle light system further includes a display 48 disposed within the interior of the vehicle. The display 48 is operably connected to each of the front camera 44 and the rear camera 46. The display 48 is powered via a connection with the vehicle battery 50. The display 48 is configured to display images captured by the front and rear cameras 44, 46. The display 48 may display images from a single camera, or may display images from the front and rear cameras 44, 46 simultaneously. The display 48 is operatively connected to the vehicle controls 49 in order control operation thereof. In this way, the display 48, along with the front camera 44, forward lights 45, rear camera 46, and rear lights 47 may each be controlled by way of the vehicle controls 50.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle light system, comprising:
   a front assembly securable to a front end of a vehicle, the front assembly comprising a plurality of lights and a first camera;
   the front assembly further comprising a housing integrated into a vehicle grill;
   the plurality of lights and the first camera disposed within the housing;
   a plurality of vents on the front assembly disposed between each of the plurality of lights;
   a rear assembly securable to a rear end of a vehicle, the rear assembly comprising a plurality of lights and a second camera thereon;
   a display operatively connected to the first camera and the second camera; and
   a control operatively connected to the front assembly the rear assembly, and the display.

2. The vehicle light system of claim 1, wherein the plurality of lights of the front assembly and the plurality of lights of the rear assembly are LED lights.

3. The vehicle light system of claim 1, wherein the plurality of lights of the front assembly are disposed in a first horizontal row and a second horizontal row, wherein the first horizontal row is disposed on an upper portion of the front end of the vehicle and the second horizontal row is disposed on a lower portion of the front end of the vehicle.

4. The vehicle light system of claim 1, wherein the plurality of lights of the rear assembly are disposed in a first horizontal row and a second horizontal row, wherein the first horizontal row is disposed on an upper portion of the rear end of the vehicle and the second horizontal row is disposed on a lower portion of the rear end of the vehicle.

5. The vehicle light system of claim 1, wherein the front assembly lights, the rear assembly lights, the first camera, the second camera, and the display are operatively connected to a vehicle battery.

6. The vehicle light system of claim 1, wherein the display is disposed within an interior of a vehicle.

7. The vehicle light system of claim 1, wherein the front assembly is configured to be operated independently of the rear assembly.

8. The vehicle light system of claim 1, wherein the first camera is operatively connected to the plurality of lights of the front assembly, and wherein the second camera is operatively connected to the plurality of lights of the rear assembly.

9. The vehicle light system of claim 8, wherein the plurality of lights of the front assembly are configured to illuminate upon activation of the first camera, and wherein the plurality of lights of the rear assembly are configured to illuminate upon activation of the second camera.

10. A vehicle light system, comprising:
  a front assembly securable to a front end of a vehicle, the front assembly comprising a plurality of lights and a first camera;
  the front assembly further comprising a housing integrated into a vehicle grill, wherein the vehicle grill is disposed on a terminal front end of the vehicle;
  the plurality of lights and the first camera disposed within the housing;
  a plurality of vents on the front assembly disposed between each of the plurality of lights;
  a rear assembly securable to a rear end of a vehicle, the rear assembly comprising a plurality of lights and a second camera thereon;
  a display operatively connected to the first camera and the second camera; and
  a control operatively connected to the front assembly the rear assembly, and the display.

11. The vehicle light system of claim 10, wherein the vehicle grill is perpendicular to a ground surface.

12. A vehicle light system, consisting of:
  a front assembly securable to a front end of a vehicle, the front assembly comprising a plurality of lights and a first camera;
  the front assembly further comprising a housing integrated into a vehicle grill;
  the plurality of lights and the first camera disposed within the housing;
  a plurality of vents on the front assembly disposed between each of the plurality of lights;
  a rear assembly securable to a rear end of a vehicle, the rear assembly comprising a plurality of lights and a second camera thereon;
  a display operatively connected to the first camera and the second camera; and
  a control operatively connected to the front assembly the rear assembly, and the display.

* * * * *